United States Patent [19]

Hultman et al.

[11] 4,143,239
[45] Mar. 6, 1979

[54] SIGNAL DISTORTION CORRECTION CIRCUIT IN TELEPRINTER EQUIPMENT

[75] Inventors: Hans E. Hultman; Alexander Strid, both of Järfälla, Sweden

[73] Assignee: U.S. Philips Corporation, New York, N.Y.

[21] Appl. No.: 859,545

[22] Filed: Dec. 12, 1977

[30] Foreign Application Priority Data

Dec. 29, 1976 [SE] Sweden ............................. 7614647

[51] Int. Cl.² .......................................... H03K 5/00
[52] U.S. Cl. ..................................... 178/68; 328/173
[58] Field of Search ................. 328/171, 173; 178/68, 178/69 A; 307/237; 325/42

[56] References Cited

U.S. PATENT DOCUMENTS

| 3,359,433 | 12/1967 | Thauland | 178/68 |
| 3,497,721 | 2/1970 | Dexter | 328/173 |
| 3,851,098 | 11/1974 | Pingault | 178/68 |

Primary Examiner—Thomas A. Robinson
Attorney, Agent, or Firm—Thomas A. Briody; James J. Cannon, Jr.

[57] ABSTRACT

A distortion correction circuit in teleprinter equipment which transmits messages between a station and a teleprinter apparatus by feeding DC-pulses through a line interconnecting the station and the teleprinter apparatus is disclosed. The line has a capacitance dependent upon the length of the line and a variable impedance element in series with the line path.

10 Claims, 18 Drawing Figures

SIGNAL DISTORTION CORRECTION CIRCUIT IN TELEPRINTER EQUIPMENT

The invention relates to a method in a teleprinter equipment adapted to transmit messages between a station and a teleprinter apparatus by feeding DC-pulses representing binary coded characters in a message through a line connecting the station and the teleprinter apparatus. The line has a capacitance dependent upon the line length, i.e. the distance between the station and the teleprinter apparatus. Furthermore the invention relates to an arrangement for realizing the method in a teleprinter equipment of described kind.

In case of such signalling by means of DC-pulses on a line the problem arises that the line capacitance causes a distortion of the signal pulses. This distortion manifests itself therein that the edges of the individual pulses are not vertical but will have a time dependent course. The detection of the current pulses is effected thereby that the current through the line is compared with a threshold current value. When the measured current is equal to the threshold value a bistable element is set, which element delivers a shaped rectangular voltage representing the received current pulses. Optimal detection is obtained if the threshold current value is selected to be equal to half the final value of the current. At the first negative edge in each pulse group representing a character a clock is started. Starting from this instant, the outut signal from the bistable element is then sampled with respect to the prevailing voltage level at intervals, which are determined by the clock with consideration taken to the actual pulse speed. The sampling intervals are selected such that they in the ideal case coincide with the middle of each pulse interval. The pulse train obtained by the sampling represents the transmitted bit sequence.

If now due to the line capacitance, which has to be charged and discharged for each current pulse, the received current pulses have edges which are not vertical but follow a certain time curve, the edges in the shaped rectangular voltage from the bistable element will be displaced relative to the correct time moments. Should the negative and positive edges be displaced equal values an output voltage should be obtained from the bistable element, which voltage has correct shape but is time displaced relative to the transmitted signal. As the clock used to determine the sampling intervals is started by means of the received signal voltage such a constant time displacement has no effect.

However, it is found that without special measures the positive and negative edges of the received current pulses will have a quite different shape. This involves that the negative and positive edges in the shaped rectangular voltage from the bistable element are displaced different values. This results in a distortion in the rectangular voltage. The longer the line is, the larger the distortion in the rectangular voltage to be sampled will be. At a certain value on the distortion it is a risk that the sampling shall result in an erroneous value and this distortion thus will limit the maximal line length between the station and the teleprinter apparatus. Contributing to the risk for an erroneous decision at the sampling is also that the clock used for determining the sampling moments will be started differently in case of different line lengths and that the clock may run a little too slow or too rapid.

A method to decrease the distortion is to increase the threshold current value at the detection but this involves the draw-back that the sensitivity for disturbances will increase.

The object of the invention is to eliminate the distortion in the shaped rectangular voltage obtained after detection in a teleprinter equipment of described kind, which is achieved thereby that the current is regulated, at least in an interval following the closing of the line path at the beginning of a current pulse, by means of a variable impedance element including in series with the said line path on the transmitting side, the control being such that the impedance value of the impedance element assumes a high value immediately after the commencement of current flow due to the closing of the line path and thereafter rapidly decreases to a low value, which is maintained during the pulse.

The effect of such a control of an impedance element in series with the line on the transmitting side is that the time course for the current through the switch element at the transmitting side in the amount of closing of the said element is drastically changed as compared with the case of using no current regulation. Hereby the time course for the current at the receiver side is also changed. More closely if no current regulation were used the line capacitance should discharge itself instantaneously through the switch element at the transmitting side resulting in a very high current peak through the element. By the current regulation with aid of a variable impedance the capacitance will instead be discharged with a low and regulated current and thus the current peak is eliminated. At the opposite side of the line, where detection of the pulses is effected, this manifests itself in that the current rises more slowly than otherwise would be the case, i.e. the front edge of the pulse will have a given slope (without current regulation on the transmitting side the slope of the front edge at the receiving side would be practically infinite). At the opening of the switch element at the end of the current pulse the line capacitance is re-charged which will always take place relatively slowly according to a given time function involving a rear edge on the current pulse having a given slope at the detector side. Thus, according to the present invention both the front edge and the rear edge of the current pulse to be detected have a given slope. It is therefore easy to ensure that the two slopes are equal, resulting in an effective distortion amounting to zero.

It is to be observed tht the favorable effect of the present invention is not a result of the limitation of the current peak at the beginning of the current pulse as such. Thus, if the current peak were limited by a "clipping" action or the like, this should not have any effect at all. The importance is that the time function for the current is influenced by means of a time varying impedance element having a time variation of a very special kind, namely a high value immediately after the closing of the switch element and falling rapidly to a very low value. This in turn results in a limitation of the current peak.

Suitably the variation of the impedance element can be such that the current pulses in the apparatus due to the closing and opening of the switch element in the apparatus form an alternating current, which is symmetric about a line coinciding with the half current value of a current pulse.

According to a first embodiment of the method according to the invention the value of the said impedance element is regulated such that the line current flowing through the teleprinter apparatus is kept substantially constant from the amount of closing of the current path at the beginning of the pulse to the end of the pulse. Hereby both edges of the current pulse on the transmitting side will have an ideal "vertical" character resulting in a substantially distortion-free pulse on the detector side.

According to a second embodiment of the invention, the impedance element is also used as switching element in the teleprinter apparatus, the control of this impedance element is such that the current is brought to follow a smooth "rounded" curve of substantially the same shape at the beginning and the end of a current pulse. Hereby the radio disturbances from the teleprinter apparatus will be minimized under maintenance of a substantially distortion-free pulse at the opposite side of the line, where detection is effected.

An arrangement for carrying out the method according to the first principal embodiment of the invention is characterized thereby that in series with the line in the teleprinter apparatus is connected a controllable semiconductive element included in a current regulating device of a type generally called "constant current generator". By bringing the said semi-conductive element to assume a high impedance value in the transient intervals immediately after the commencement of current flow and then decreasing its impedance value, the current will be limited during said transient intervals to a pre-set value equal to the current flowing through the line in steady state. Suitably the current set in the constant current generator is such that the voltage across the generator, when this current prevails, is substantially equal to zero. This means that the value of the impedance element in steady state is practically equal to zero and the current regulation device has reached one limit of its control range.

An arrangement for carrying out the method according to the second principal embodiment of the invention is characterized thereby that in series with the line in the teleprinter apparatus is connected a controllable semiconductive element having a combined function by serving both as variable impedance element and said switch element. The semi-conductive element forms a part of a current regulation device adapted to instantaneously adjust the current through the line by influencing the semi-conductive element such that in each moment it corresponds to the value of a control voltage applied to the current regulation device, which control voltage is produced by a pulse shaper fed with a rectangular voltage forming said pulses representing binary coded characters in a message, which pulse shaper converts the said pulses in the rectangular voltage to a substantially symmetric pulse signal having a finite slope on both pulse edges. The shape of the control voltage fed to the controllable current regulation device can suitably be approximately similar to the charge and discharge voltage, respectively, for a capacitor, which can be achieved thereby that the rectangular voltage comprising the pulses representing characters in a message is fed to the current regulation device via an LP-filter. In a preferred embodiment the filter is an active LP-filter of at least the 2nd degree.

The invention is illustrated in the accompanying drawings, in which

FIGS. 3a, 3b, and 3c show examples of some current and voltage curves in the equipment according to FIG. 1, FIGS. 4a, 4b, 4c, and 4d show the corresponding curves for the equipment according to FIG. 2 in case of constant current regulation, FIGS. 10a, 10b, 10c, and 10d show some curves for explaining the function of the arrangement according to FIG. 8.

Figure 1:
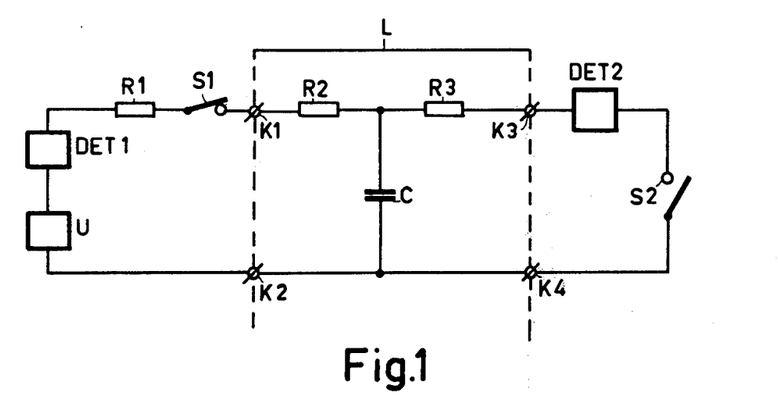
FIG. 1 shows a simplified circuit diagram for a telex equipment, where the invention can be utilized.
Figure 2:
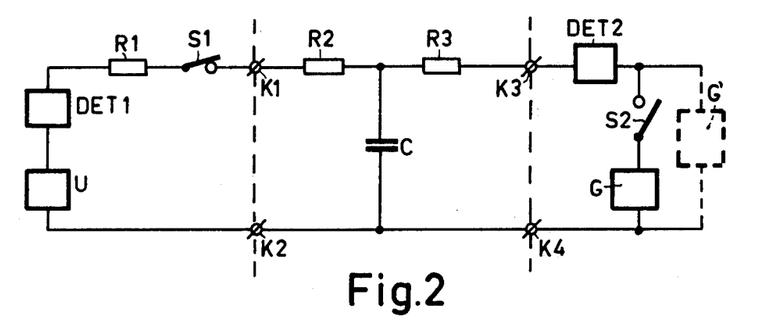
FIG. 2 shows a corresponding circuit diagram for the same equipment completed with an arrangement according to the invention.

In FIGS. 1 and 2, which only comprise the details necessary for the understanding of the invention, a telex station is shown in the left of the left hand dotted vertical line and a telex apparatus is shown to the right of the right hand dotted line, while a line connecting the station and telex apparatus is shown between the dotted lines.

The station comprises according to FIG. 1 a DC-current source U, the terminals of which via a series circuit consisting of a detector DET1, a resistance R1 and a switch S1, are connected to two output terminals K1, K2. The terminals K1, K2 are connected to one end of a two-wire line L, which in the drawing is represented by two series resistances R2, R3 and a parallel capacitance C. The opposite end of the line L is connected to two input terminals K3, K4 on a telex apparatus.

This apparatus consists according to the drawing of a series circuit comprising a detector DET2 and a switch S2.

Signalling from the station to the telex apparatus is effected by alternatingly closing and opening the switch S1 with the switch S2 continuously closed, so that current pulses are generated, which in binary shape represent the characters in a message and which pulses are detected in the detector DET2. In a corresponding manner signalling from the telex apparatus to the station is effected by alternatingly closing and opening the switch S2 with S1 continuously closed so that current pulses are generated, which are detected in DET1.

Considering the said last case with signalling from the telex apparatus to the station the current I (1) which is detected in the station when the switch S2 is closed and the capacitor C is discharged, will follow a curve which is determined by the relation $$I(1) = \frac{U}{R1 + R2 + R3} (1 - e^{-\frac{t}{\tau 1}})$$

where $$\tau 1 = \frac{(R1 + R2) R3 \, C}{R1 + R2 + R3} \quad (1)$$

and U, R1, R2, R3 and C represent the value of the respective component having the same designation, while t is time.

When the switch S2 is opened and the capacitor C is charged the current I (2) will follow a curve, which is determined by the relation $$I(2) = \frac{U}{R1 + R2 + R3} e^{-\frac{t}{\tau 2}} \qquad (2)$$

where $$\tau 2 = (R1 + R2) C.$$

It is evident of the above relations that the time constants $\tau 1$ and $\tau 2$ are different and that the difference between them increases with increasing C, i.e. with increasing line length. More exactly $\tau 1$ is smaller than $\tau 2$, which thus involves that the capacitor C is discharged more rapidly than it is charged.

Figures 3, 3C:
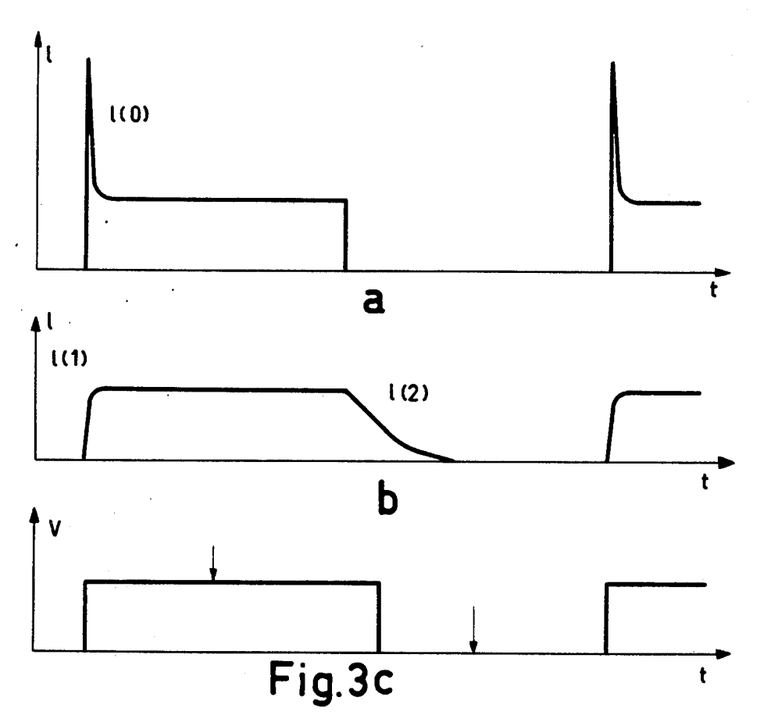

The behavior is illustrated in FIG. 3, where the upper diagram (a) shows the current I (0) through the switch element S (2) in the teleprinter apparatus and the next diagram (b) shows the shape of the above identified currents I (1) and I (2) in the station. In the lower diagram (c) in FIG. 3 is shown the output voltage V from a bistable element, which is controlled by the current according to FIG. 3 (b), it being assumed that the threshold current value, at which the bistable element is set, is equal to half the maximum value. The output voltage from the bistable element, on which sampling is for example effected in moments indicated by the arrows in the drawing, is as shown essentially distorted in the sense that the pulses are longer than the pulse gaps.

FIG. 2 shows the same telex equipment as in FIG. 1 but completed with an arrangement according to the invention. The equipment according to FIG. 2 is identical to the equipment in FIG. 1 with the only difference that a current regulation device has been connected in series with the line in the telex apparatus. In a first embodiment of the invention shown by full lines in FIG. 2 this current regulation device is a so-called "constant current generator" G. In this case it is assumed that the line is interrupted abruptly at the end of a current pulse so that the current ceases instantaneously (no current regulation at the rear edge of the current pulse). In a second embodiment of the invention shown by dotted lines in FIG. 2 the current regulation device G' has also the function of switching element in the teleprinter apparatus and in this case this current regulation device G' is adapted to influence both the front edge and rear edge of a current pulse when transmitting from the teleprinter apparatus. In both cases the current regulation device regulates the current such that the current pulses in the transmitting teleprinter apparatus form an alternating current, which is symmetrical about the half current value of the pulses, whereby the pulses to be detected at the opposite side will also form a symmetrical alternating signal and the effective distortion is zero.

For the first case with constant current regulation this can be proved mathematically. If namely the constant current Ig, on which the current generator is set and which it tries to maintain, is determined by the relation $$Ig = U/(R1 + R2 + R3) \qquad (3)$$

the current I (1)', which is detected in the station upon closing of S2, will follow a curve, which is determined by the relation.

$$I(1)' = \frac{U}{R1 + R2 + R3} (1 - e^{-\frac{t}{\tau}}) \qquad (4)$$

where $$\tau = (R1 + R2) C.$$

The current I (2)', which is detected in the station upon opening of S2, is exactly the same as the corresponding current in the previously described case without current generator G and thus determined by the relation (2). The time constant at closing and opening of S2 will thus in this case be the same, namely equal to (R1 + R2) C.

The shape of the current I (0)' in the telex apparatus at closing and opening of S2 in this case is shown in the uppermost diagram a in FIG. 4. The next diagram b in FIG. 4 shows the shape of the currents I (1)' and I (2)' in the station at closing and opening, respectively, of the switch element S2 in the telex apparatus, while diagram c in FIG. 4 shows the output voltage V' from the bistable element, which is controlled by the current according to FIG. 4b, in case that the threshold current value, at which the bistable element is set, amounts to half the final current value. The distortion is in this case zero but the whole curve representing the output voltage from the bistable element has been displaced a distance $\Delta T$ in relation to the curve representing the transmitted current pulses.

Figure 4A:
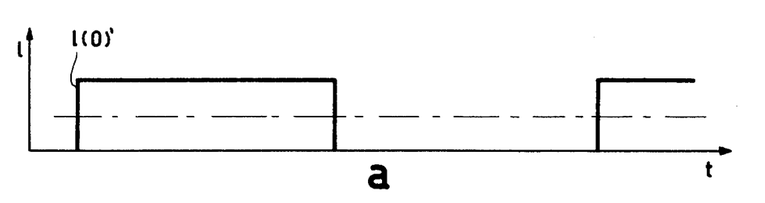
Figure 4B:
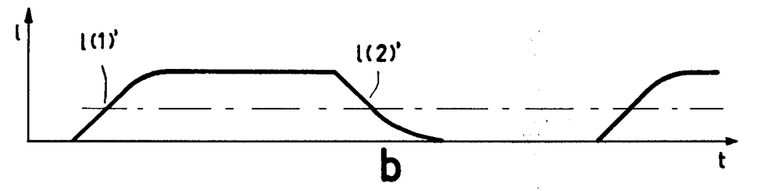
Figure 4C:
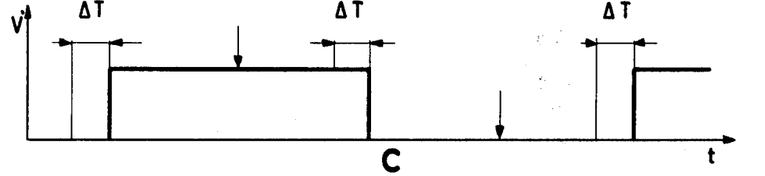

A comparison between the FIGS. 3 a and 4 a reveals that the effect of such a constant current generator is that it eliminates the high current peak, which would otherwise have appeared at the beginning of the pulse on the transmitting side. One can also state that the current pulses on the transmitting side provided according to the invention are re-shaped so as to form an alternating current, which is symmetrical about a line (shown by dash-and-dotted line in the FIG. 4a) coinciding with the half current value of the current pulses. Thus the current pulses on the receiving side will also form a symmetrical alternating signal, as shown by curve 4 b.

In practice this current regulation can suitably be effected by means of a passive element in the shape of a variable impedance element connected in series with the line on the transmitting side. It is evident that the variation in this impedance element must be such that it has a high impedance value immediately after the moment of closing of switch S2, when the line capacitance has full voltage, whereafter the impedance value shall decrease rapidly as the voltage across the capacitance decreases due to the discharge through said impedance element. In steady state the impedance value of the impedance element should theoretically amount to zero, which means that the condition (3) is fulfilled.

The mathematical expression for the impedance or resistance value Rs of the impedance element after the closing of S2 will under these conditions be as follows $$Rs = (\frac{U}{Ig} - R3) e^{-\frac{t}{\tau}}$$

where $\tau = (R1 + R2) C.$

Figure 4D:
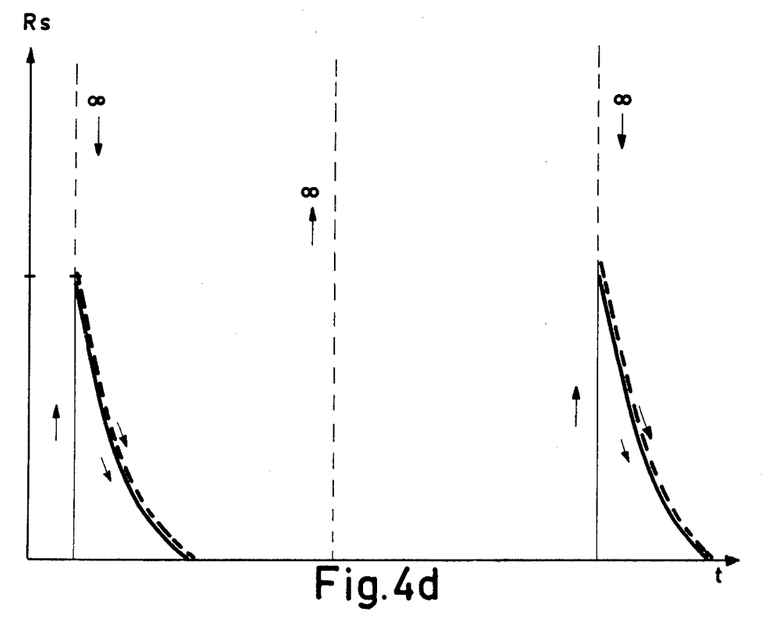

The variations in Rs are shown in FIG. 4d, where the curves shown by dashed lines are valid for the case that the impedance element is also serving as switching element.

The setting of the current generator with $$Ig = U/(R1 + R2 + R3)$$

involves that the whole voltage is appearing across R1, R2 and R3 and that the voltage across the current generator G is zero. This in turn involves that the generator has decreased its resistance as far as possible, namely to the value zero, and that it thus is situated at one limit of its control range.

In practice the setting is suitably effected in such manner that the current generator is initially set on a current, which it tries to maintain, which is equal to the desired nominal current through the line, for example 40 mA. The current generator with this setting is then connected in series with the line and the two switches S1 and S2 are closed. Provided that the actual conditions are such that the generator comes within its control range, it then will automatically vary its impedance such that it takes up such a voltage that the pre-set current flows through the line. The variable resistance R1 situated in the station is thereafter increased successively under observation of the current through the line. As the resistance R1 is increased this resistance will take over a greater and greater part of the battery voltage, while the voltage across the current generator G will decrease in corresponding degree. The increase of R1 is continued until the line current begins to decrease. This means that the current generator no longer is able to regulate the current to the set value, which in turn means that it has the lowest possible impedance and a voltage, which is so near zero as possible, which was the required condition. The resistance R1 is then locked in the attained position.

Figure 5:
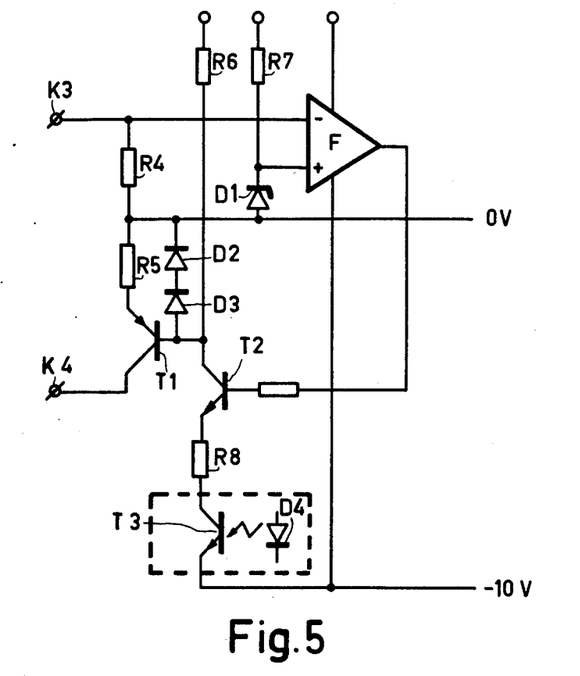
FIG. 5, 6, and 7 show three different embodiments of a "constant current generator" or "constant current sink" which is used as regulation device according to a first aspect of the invention.

FIG. 5 shows a first embodiment of "constant current generator" or "constant current sink" which can be used in the equipment according to FIG. 2. As control element it has a transistor T1, the emitter-collector path of which in series with two resistances R4, R5 is connected to the terminals K3, K4 and thus in series with the transmission line L. The transistor T1 is controlled with the output voltage from an operational amplifier F, the output of which is connected to the base in a transistor T2, which in turn controls the transistor T1 thereby that it has its collector connected to the base of the transistor T1. The transistor T2 obtains positive supply voltage from a local voltage souce via a resistance R6. The operational amplifier acts as a differential amplifier and has two inputs designated with + and −. To one of the inputs, the minus input, the voltage appearing across the resistance R4 and thus varying with the line current through the transistor T1 is applied. To the second input, the plus input, the voltage across a Zener diode D1, which obtains current from the local voltage source via a resistance R7, is applied. The interconnected terminals of the resistance R4 and the Zener diode D1 not connected to the amplifier F are connected to the 0 pole of the local voltage source. The emitter of the control transistor T2 is connected to a negative pole on the local voltage source via a resistance R8 and an optocoupling device comprising a photo transistor T3. The photo transistor T3 serves as a switch (corresponding to S2 in FIG. 2) and is switched between conductive and non-conductive condition by means of a luminescent diode D4. Two diodes D2, D3 are finally connected between the base of the transistor T1 and the point of connection between the resistances R4 and R5. The operation is as follows:

Signalling is produced by alternate bringing the photo transistor T3 to be conductive and non-conductive by means of the luminescent diode D4. When the transistor T3 is non-conductive the base of the transistor T1 will have a positive voltage, which is equal to the voltage drop in the forward direction across the two series connected diodes D2 and D3. The transistor T1 is thereby kept in non-conductive condition and no current can flow through it to the terminals K3, K4 connected to the line. The diodes D2 and D3 are arranged in order to protect the transistor T1 as its base in absence of these diodes should obtain a voltage, which is equal to the full positive voltage of the local voltage source. The differential amplifier F receives a voltage on its plus-input which is equal to the voltage of the Zener diode D1, while it on its minus-input receives the voltage 0. The amplifier F therefore delivers a high control voltage to the transistor T2. This transistor, however, cannot have any influence on the current conditions because the control circuit, in which it is included, is interrupted by the transistor T3.

When the transistor T3 is made conductive by means of the luminescent diode D4 a current will flow through the resistance R6, the transistor T2, which is strongly conductive due to the output voltage from amplifier F, and the transistor T3. The voltage drop across the resistance R6 provides that the voltage on the base of the transistor T1 decreases and the transistor T1 is driven towards conductive condition. A current from the line begins to flow through the resistances R4, R5 and the transistor T1 which increases rapidly. When the voltage across R4 applied to the minus input of the amplifier F begins to approach the voltage across the Zener diode D1, the output voltage from the amplifier F starts to decrease and the transistor T2 is regulated towards cut-off condition. The transistor T2 in turn regulates the transistor T1 downwardly, so that the current through the branch R4, R5, T1 will stabilize on a value, at which the voltage drop across R4 is substantially equal to the voltage of the Zener diode D1. The control takes place practically simultaneously with a negligible time constant and the current is consequently maintained on the above defined value both during the first time moment after closing of T3, when the line capacitance discharges, during which moment without current regulating device a very strong current surge should have arisen, and during the stationary condition following thereafter, when the capacitance is already discharged.

Figure 6:
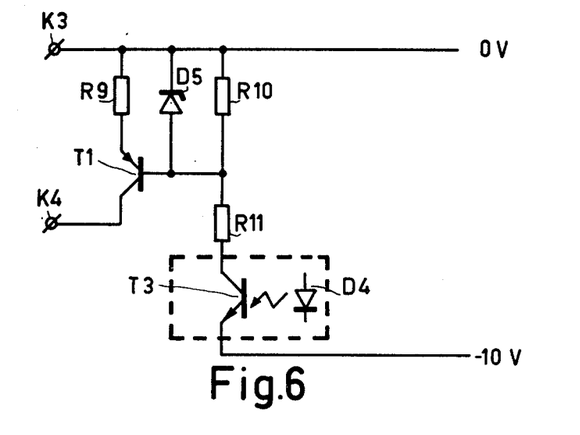

FIG. 6 shows a second simplified embodiment of constant current generator, which can be utilized in an equipment according to the invention. Likewise as in the previously described embodiment the current regulating element is formed by a transistor T1, the collector-emitter path of which is connected in series with a resistance R9 between the line terminals K3, K4. A Zener diode D5 is connected between the base of the transistor T1 and the terminal K3, which in turn is connected to the positive pole of a local voltage source. The base of the transistor T1 is furthermore connected to the connection point between two resistances R10 and R11, which are connected in series with the photo transistor T3 controlled by the luminescent diode D4 between the two poles of the local voltage source.

The operation is as follows:

When the photo transistor T3 is non-conducting the base of the transistor T1 receives via the resistance R10 the same voltage as its emitter and the transistor T1 is cut-off. No line current can flow.

When the transistor T3 is made conducting by means of the luminescent diode D4 the base of the transistor T1 receives a negative voltage, which corresponds to the voltage across the Zener diode D5 and will be strongly conducting. The current from the line causes a voltage drop across R9, which decreases the base-emitter voltage of the transistor T1. When the voltage drop across R9 approaches the voltage of the Zener diode the transistor T1 is regulated downwardly towards cut-off condition and the current stabilizes on a value, at which the voltage drop across R9 is substantially equal to the voltage across the Zener diode D5.

Figure 7:
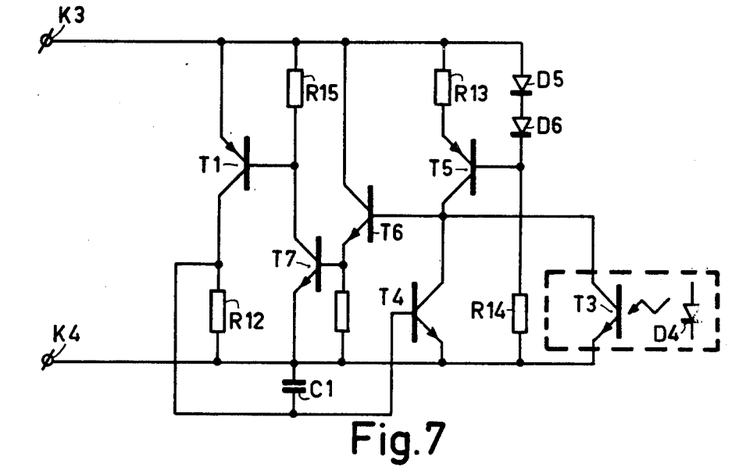

FIG. 7 shows a further embodiment of the constant current generator, which is usable for the realization of the invention. Likewise as previously the current regulating element is formed by a transistor T1, the collector-emitter path of which is connected in series with a resistance R12 between the terminals K3 and K4. In parallel across the resistance R12 the base-emitter path of the transistor T4 is connected, which is supplied with current from a current generator of the same type as that shown in FIG. 6. The current generator comprises a transistor T5, two resistances R13, R14 and two diodes D5, D6. Current generator current is applied thereto from the line via the terminals K3, K4. The transistor T5 included in the current generator also feeds current to the base of a first transistor T6 in pair of transistors T6, T7, which are arranged in a Darlington-circuit between the line terminals K3, K4. The last transistor T7 in the said pair controls the transistor T1 thereby that the connection point between its collector and the collector resistance R15 is connected to the base of the transistor T1. A photo transistor T3 acting as a switch and controlled with the luminescent diode D4 is finally connected in parallel across the transistor T4, and a capacitor C1 is connected across the base-emitter path of the transistor T4. The capacitor C1 produces stabilization and prevents self-oscillation.

The operation is as follows:

When the transistor T3 is conducting the whole current from the current generator T5, R13, R14, D5, D6 passes through T3 and all the transistors T4, T6, T7 and T1 are cut-off. No line current can flow through the transistor T1.

When the transistor T3 is made cut-off current from T5 begins to flow to the base of the transistor T6, whereby the transistor T6 begins to draw current as well as the transistor T7. When current flows through the transistor T7 the voltage on the base of the transistor T1 will decrease and T1 begins to conduct. The current through the transistor T1 causes a voltage across the resistance R12, which is fed to the base of the transistor T4 so that also this transistor T4 begins to conduct. The current through T1 increases rapidly until the voltage across R12 amounts to the forward voltage drop across the base-emitter path of T4, i.e. approximately 0.6 V.

When this condition has been reached and the current through T1 tends to increase further the transistor T6 and thereby also the transistors T7 and T1 are regulated in direction towards cut-off condition. The current through T1 stabilizes in this case on a value, at which the voltage drop across R12 is approximately 0.6 V.

An advantage of this last embodiment is that it does not require any local voltage source. However, a drawback is that the circuit will draw a small current from the line also when the transistor T1 is cut off, i.e. in the gap between current pulses. This current can, however, be kept small, for example of the magnitude 1-2% of the nominal line current during a current pulse.

Figure 8:
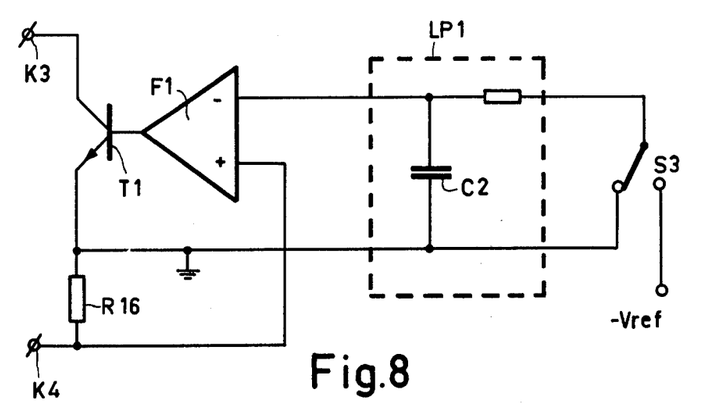
FIG. 8 and 9 show two embodiments of a current regulation device, in which both edges of the current pulses are shaped in accordance with a second aspect of the invention.

FIG. 8 shows a simplified diagram for a device according to the invention, in which both edges of the current pulse on the transmitting side are shaped by means of a current regulation device, the variable impedance element of which at the same time serves as switching element. The impedance element is likewise as in the previous examples constituted by a transistor T1, the collector-emitter path of which is connected in series with the line between the terminals K3 and K4 in series with a small measuring resistance R16. The voltage across the measuring resistance R16 is in each instant proportional to the current through the line and this voltage is led to one input (the plus-input) of an operational amplifier F1 serving as a differential amplifier. The output voltage of the operational amplifier F1 is led as a control voltage to the base of the transistor T1 and the second input (the minus-input) receives voltage from a passive low-pass RC-filter LP1 of first degree. The input of the filter LP1 is connected to the movable contact element in a make-and-break contact S3, the two fixed contact elements of which are connected to ground and a negative reference voltage $-V_{ref}$, respectively. The make-and-break contacts S3 forms transmitting switch in the telex apparatus and is normally in the shown position, in which the movable contact element is connected to ground. The operational amplifier F1, transistor T1 and measuring resistance R16 form a closed regulation loop with negative feed-back, in which the voltage difference between the two inputs of the amplifier serves as error voltage. This error voltage is amplified and causes such a control voltage to be fed to the transistor T1, so that this transistor, by varying its impedance, regulates the current and thereby the voltage across the measuring resistance such that the error voltage is regulated to zero, i.e. the voltage at the plus-input is at each instant equal to the negative voltage at the minus-input.

The operation of the shown arrangement is such that when the switch is in the shown position, in which the minus-input has the potential zero, the operational amplifier F1 delivers such a voltage to the transistor T1 that this transistor is cut-off, whereby the voltage across the measuring resistance R16 is zero and also the plus-input has zero potential. In the instant when the switch is set in the opposite position, charging of the capacitor C2 included in the RC filter LP1 starts and the instantaneous value of the voltage across the capacitor during the charging is applied to the minus input. As soon as the voltage at the minus-input deviates from zero the voltage difference between the two inputs will bring the amplifier to deliver such a control voltage to the transistor that this starts to form a current. This current is in the first instant very low but increases as the negative voltage on the minus input increases. The control of the transistor is such that the voltage across the measuring resistance in each instant is equal to the voltage across the capacitance, whereby the line current flowing through the transistor T1 and the measuring resistance R16 is brought to follow the variations in the voltage across the capacitor C2. When the switch S3 is opened again at the end of a pulse discharging of the capacitor C2 starts and in each instant the voltage across the capacitor is active at the minus-input of the amplifier F1. Again the control of the transistor T1 is such that the line current will follow the variations in the capacitor voltage during the discharge.

This is illustrated in the FIG. 10, where diagram a shows the voltage Vf coming from the low-pass filter LP1 and thus the current through the line at the apparatus end, in the drawing designated I (0)". As the front edge of the current curve represents a charging curve for a given capacitor through a given resistance and the rear edge represents a discharging curve for the same capacitor and the same resistance it is evident that the two edges are identical (but "inverted"). If a line is drawn parallel with the time axis on a height above the said time axis equal to the half maximal amplitude of the current pulse, as shown by the dash-and-dotted line in FIG. 10 a, it is also evident from the Figure that the current curve is exactly symmetric about this line. With symmetry is in this case meant that the positive half period is equal to the negative half period. The diagram b in FIG. 10 shows the current in the receiving station, where the current pulses are detected. Also these pulses, which in conformity with the foregoing are designated I (1)″ at the front edge 1 and I (2)″ at the rear edge, form a symmetric alternating signal about the half maximal amplitude. Diagram 10 c shows the voltage after detection of the current pulses shown in FIG. 10 b by means of a threshold level, which is equal to the half maximal amplitude of the current pulses. Due to the symmetry this detected voltage represents a distortion-free signal.

The control of the transistor T1 involves in this case the effective impedance between emitter and collector of the transistor in the moment, when the movable contact element of the switch S3 is connected to $-V_{ref}$, which varies from an infinite to a finite value not abruptly but according to a smooth curve. At the return of the switch S3 to the shown position the corresponding variation in the effective impedance of the transistor takes place in inverse order.

Figure 10D:
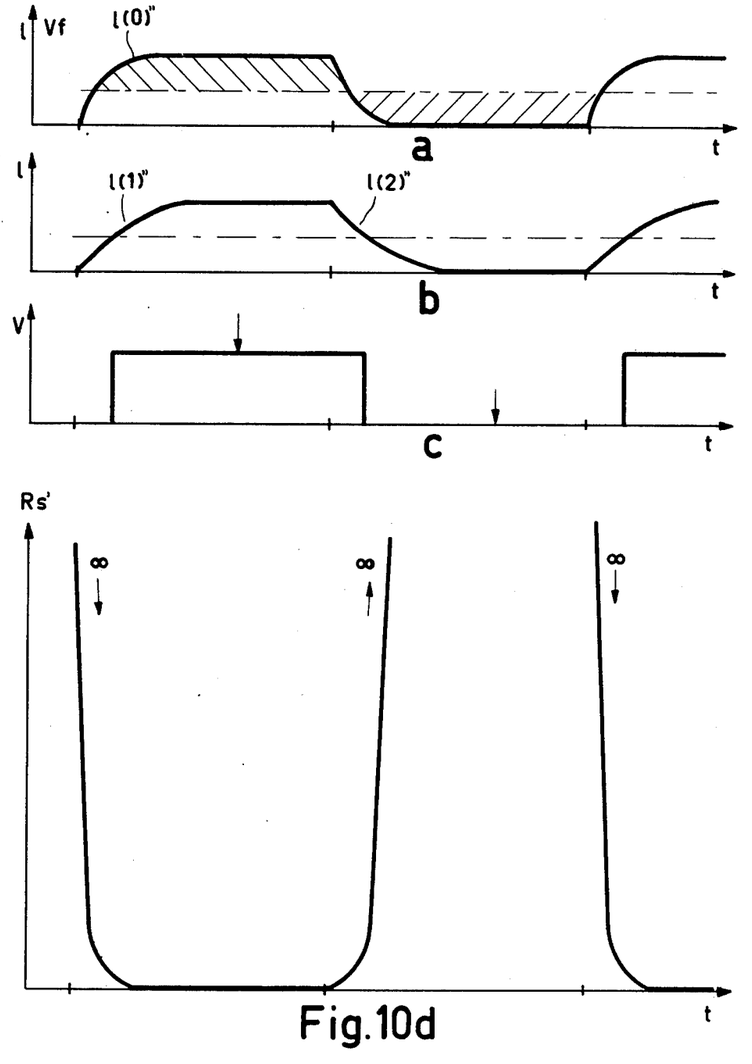

The impedance variation Rs' of the transistor T1 in this case are illustrated by the curve d in FIG. 10.

Figure 9:
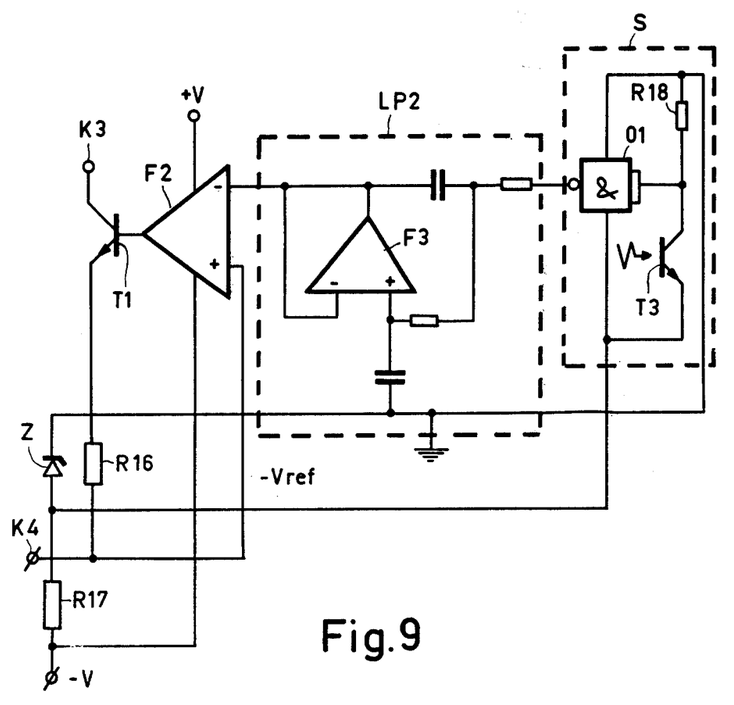

FIG. 9 shows a circuit diagram for a more developed embodiment of a device according to the invention operating in principle in the same manner as the device shown in FIG. 8. As in FIG. 8 the variable impedance element serving at the same time as switching element is constituted by a transistor T1, which is connected in series with a small measuring resistance R16 between the terminals K3 and K4 and which is controlled on its base with the output voltage from an operational amplifier F2. The amplifier F2 receives drive voltages via two terminals designated V and $-$V, respectively. The voltage across the measuring resistance R16 is led to the plus-input of the amplifier F2, while the output voltage from a filter LP2 is led to the minus-input. The control loop formed by the amplifier F2, the transistor T1 and the measuring resistance R16 is likewise as in FIG. 8 such that the difference between the voltages on the plus-input and minus-input of the amplifier by influence on the transistor T1 is regulated to zero. The filter LP2 receives input voltage from a switch unit S, which in turn receives reference voltage $-V_{ref}$ from a series circuit comprising a Zener diode Z and resistor R17 connected between earth and terminal $-$V.

The filter LP2 is in this case an active filter of the second degree and comprises an operational amplifier F3 connected in feed-back. The switch unit comprises a photo transistor T3 connected in series with a resistor R18 between a line having reference voltage $-V_{ref}$ and ground. The connection point between the phototransistor and the resistor R18 is connected to the control input of a C-MOS logic circuit 01 with an AND-function. To the C-MOS circuit is also connected the reference voltage $-V_{ref}$ and ground.

The operation of the device shown in FIG. 9 is as follows.

In stand-by or normal condition the photo transistor T3 is illuminated and conductive. Reference voltage $-V_{ref}$ is fed to the control input of the C-MOS AND-circuit 01, which circuit due to its inverted action delivers 0 V at its output. In this condition also the active filter LP2 delivers zero voltage at its output and the transistor T1 is cut-off. In the moment when the illumination of the photo transistor T3 is interrupted this transistor will be non-conductive and zero voltage is fed to the control input of the C-MOS circuit 01. Hereby this C-MOS circuit will deliver reference voltage $-V_{ref}$ at its output. The output voltage from the active low-pass filter LP2 starts to increase in negative direction and will after a time period reach the negative reference voltage according to a time function determined by the filter characteristic. The line current will follow the same curve from zero to steady state current.

The curves shown in the FIG. 10 are applicable also to this case although that the curves will have a slightly different shape.

Many modifications of the shown arrangements are possible within the scope of the invention. Thus, it is possible in the first embodiment to use any kind of constant current generator. In this case it is also possible to have a separate switching element instantaneously switching between conductive and non-conductive condition in series with an impedance element only serving as impedance. In the second case with shaped edges both at the beginning and at the end of the current pulse on the transmitter side it is possible to use any kind of filter, passive or active, having principally the same step response as the shown filters. Even quite different kinds of pulse-shaping devices can be used for achieving the desired shape of the transmitted pulses. In principle a current regulation device of described kind can also be connected in series with the line in the station, which device will have the same effect as described when transmitting from the station.

What is claimed is:

1. A method of transmitting dc pulses in a teleprinter communication system along a line which has a capacitance depending upon the length of the line and which includes a variable impedance element in series with the line comprising the steps of:
   producing a current flow during a time interval following the closing of the line path at the beginning of a current pulse;
   changing the value of the impedance element to a high first value immediately following the commencement of current flow;
   subsequently rapidly decreasing the value of the impedance element to a low second value so that the line current flowing is kept substantially constant; and
   maintaining the impedance element at said low second value to the end of the pulse.

2. A method of transmitting dc pulses in a teleprinter communication system along a line which has a capacitance depending upon the length of the line and which includes a variable impedance element in series with the line comprising the steps of:
   producing a current flow during a time interval following the closing of the line path at the beginning of a current pulse;

changing the value of the impedance element to a high first value immediately following the commencement of current flow; and subsequently rapidly decreasing the value of the impedance element so that the line current flowing as a function of time follows a smooth curve having a finite and equal slope at the beginning of the pulse and the end of the pulse.

3. An arrangement for teleprinter equipment in which dc pulses representing characters are transmitted along a line comprising:

switch means in series with the line which generate the dc pulses; and a constant current generator in series with the line including a controllable semiconductive element which functions to limit the current flow in said line, during a time interval immediately following the commencement of current flow, to a predetermined value so that the value of the current flow is kept substantially constant during each of the dc pulses.

4. An arrangement as defined in claim 3 wherein said constant current generator comprises first and second terminals, said generator functioning to maintain a substantially zero voltage across said first and second terminals.

5. An arrangement as defined in claim 4 further comprising variable resistance means functionally connected in series with the line which function to maintain said substantially zero voltage across said first and second terminals of said generator.

6. An arrangement as defined in claim 5, wherein said controllable semiconductive element functions as a switch which switches between a conducting and a non-conducting state.

7. An arrangement for teleprinter equipment in which dc pulses representing characters are transmitted along a line comprising:

a pulse generator for forming a sequence of rectangular pulses representing binary coded characters in a message;

a pulse shaper connected to said pulse generator which converts said pulses to substantially symmetric pulse signals having a finite slope on both the front and rear pulse edges;

current regulation means connected to said pulse shaper and controlled by said pulse signals for instantaneously adjusting the current through the line, including a controllable semiconductive element which functions to act as a variable impedance element in the line and as a switch element for generating the dc pulses in the line.

8. An arrangement as defined in claim 7 further comprising a low pass filter connected between said pulse shaper and said current regulation means.

9. An arrangement as defined in claim 7 wherein said low pass filter is an active filter of at least second degree.

10. In a teleprinter communications system of the type in which dc pulses representing characters in a message transmitted along a line are generated by closing and opening a switch in series with the line, and including a constant current generator in the teleprinter connected in series with the line, the improvement comprising:

a controllable semiconductive element in said constant current generator which functions to limit the current flow to a predetermined value equal to the value of the current flow during steady-state operation of the system during a time interval immediately following the commencement of current flow by assuming a high impedance value at that time.

* * * * *